United States Patent Office 3,472,145
Patented Oct. 14, 1969

3,472,145
SILVER HALIDE EMULSIONS CONTAINING ACYLACETYLAMINO COUPLERS CONTAINING SULFURIC ACID ESTER GROUPS
Alfred Froehlich, Marly-le-Grand, Switzerland, assignor to Ciba Limited, Basel, Switzerland, a company of Switzerland
No Drawing. Continuation-in-part of application Ser. No. 301,615, Aug. 12, 1963. This application Dec. 21, 1967, Ser. No. 692,311
Claims priority, application Switzerland, Aug. 31, 1962, 10,400/62
Int. Cl. G03c 1/40, 7/00
U.S. Cl. 96—100   6 Claims

ABSTRACT OF THE DISCLOSURE

The present invention relates to a light-sensitive photographic layer for the color developing process containing an acylacetylamino compound as color former for yellow dyestuffs. The acylacetylamino compound contains sulfuric acid ester groups, is readily soluble in water, and is fast to diffusion. Processed coatings are completely transparent.

Cross reference

This application is a continuation-in-part of applicant's copending application Ser. No. 301,615, filed Aug. 12, 1963, the disclosure of which is relied on and incorporated by reference in this application.

The present invention provides new acylacetylamino compounds containing sulfuric acid ester groups that correspond to the formula (1)

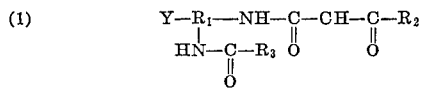

in which $R_1$ represents a benzene radical, $R_2$ represents a benzene radical or a cycloalkyl radical or an alkyl radical, $R_3$ represents an alkyl radical containing at least 3 carbon atoms and Y represents an acid sulfuric acid ester group.

The said group Y thus corresponds to the formula (2)   Me—O—SO$_2$—O— in which Me represents a cation, for example, sodium, potassium, ammonium or hydrogen.

The acid sulfuric acid esters are obtained by treating an acylacetylamino compound of the formula (3)

in which $R_1$, $R_2$ and $R_3$ have the meanings given above and X represents an alkoxy group containing at most 2 carbon atoms, with chlorosulfonic acid in the presence of an organic solvent.

The compounds of the Formula 3 that contain alkoxy groups and that are used as starting materials in the process of the invention are advantageously obtained by reacting an amine of the formula (4)

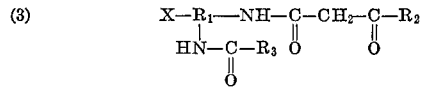

with an ester of the formula (5)

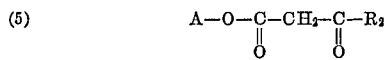

in which $R_1$, $R_2$, $R_3$ and X have the meanings given above, and A represents a methyl or an ethyl radical.

The compounds thus obtained, that contain alkoxy groups and that correspond to the Formula 1 may contain further substitutents attached to the benzene radicals, for example, halogen atoms such as chlorine, ethyl or methyl groups, and further ethoxy groups or preferably methoxy groups. The alkyl radicals $R_3$ advantageously contain 11 to 21 carbon atoms. As cycloalkyl radical $R_2$ there is primarily used a cyclohexyl radical. In addition, acylacetylamino compounds of the formula (6)

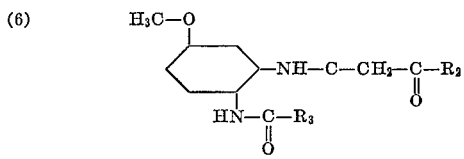

in which $R_2$ represents a benzene radical or a methyl group and $R_3$ represents an alkyl radical containing 11 to 21 carbon atoms, are preferred.

In accordance with the invention, compounds of the Formula 3 that contain alkoxy groups are treated with chlorosulfonic acid in the presence of an organic solvent. Inert organic solvents are advantageously used, that is to say, solvents that do not react with chlorosulfonic acid under the selected reaction conditions. Suitable solvents are, for example, halogenated hydrocarbons such as methylene chloride, chloroform, dichloroethane, and chlorobenzene, the aliphatic chlorinated hydrocarbons being specially suitable. However, solvents that are free from halogens may also be used, for example, benzene or carbon disulfide. In general, it is of advantage to use a solvent in which chlorosulfonic acid is soluble.

In general, the reactions are advantageously carried out at a moderately elevated temperature, for example, at a temperature between 30 and 100° C.

The treatment with chlorosulfonic acid in the presence of an inert solvent converts the low-molecular alkoxy groups in the acylacetylamino compounds of the kind defined into acid sulfuric acid ester groups of the Formula 2. When the reaction is finished, the sulfuric acid esters can be precipitated out of the reaction mixture, for example, by dilution with suitable solvents, advantageously solvents that are readily soluble in the solvent used in the reaction as well as in water.

The new sulfuric acid esters so obtained can be used, for example, as intermediate products for the manufacture of dyestuffs. They are specially suitable as color couplers for yellow dyestuffs in light-sensitive photographic layers, as they are fast to diffusion and readily soluble in water. Processed coatings of the present couplers are, as a result of the favorable solubility characteristics of the couplers, completely transparent. Many of the yellow dyestuffs formed by chromogenic development with these compounds possess a very pure shade and exhibit very favorable absorption properties.

The incorporation of the sulfuric acid esters in the light-sensitive layer and the production of the colored photographic images can be carried out in the conventional, known manner. The sulfuric acid esters, if necessary, in the form of alkali salts, are soluble in water and can be added to the color developer or the emulsion before casting.

The following examples illustrate the invention. Unless otherwise stated, the parts and percentages are by weight.

EXAMPLE 1

110 grams of 1-amino-2-stearoylamino-5-methoxybenzene are dissolved in 500 cc. of xylene, and 78 grams of para-methoxybenzoylacetic acid ethyl ester dissolved in 100 cc. of xylene are added dropwise, at boiling temperature, in the course of 10 minutes to this solution in such a manner that 400 cc. of a xylene/alcohol mixture are distilled off at the same time. The residue is stirred into 1500 cc. of methanol, the mixture is cooled, suction-filtered and the radical is washed with methanol. After drying, the filter residue is recrystallized from acetone. About 136 grams of the compound of the formula (7) 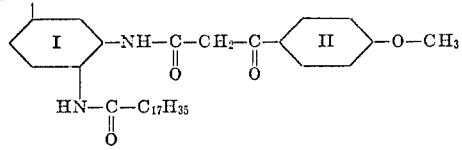

melting at 110 to 112° C. are obtained.

136 grams of the product so obtained are introduced at room temperature into a mixture comprising 310 cc. of methylene chloride and 68 cc. of chlorosulfonic acid. The mixture is heated for 10 minutes at the boil, is allowed to stand for 30 minutes, whereupon it is diluted with 600 cc. of acetone and cooled for 5 hours in ice. The mixture is then suction-filtered, washed with acetone, the filter residue is boiled with 100 cc. of acetone, cooled, suction-filtered and the filter residue is washed with acetone. (Melting point: 157 to 159° C.) The residue is then introduced into a solution of 400 cc. of methanol and 40 grams of crystallized sodium acetate and boiled for a few minutes. After cooling the reaction mixture, it is suction-filtered and the filter residue is washed with methanol. The yield is approximately 94 grams. Determination of the methoxyl groups (according to Zeisel) of a product so obtained showed that one of the two methoxyl groups was converted into the sulfuric acid ester group. Further investigation showed that the methoxy group so converted was the one attached to the benzene ring I. The compound can be used as yellow coupler for the chromogenic development process. In the form of the free acid, it corresponds to the formula (8) 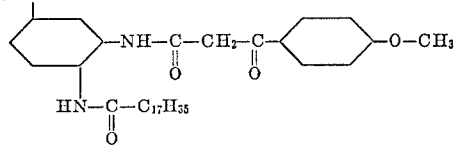

EXAMPLE 2

58 grams of stearoylamino-benzoylacetylaminomethoxy-benzene of the formula (9) 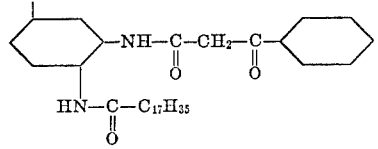

are dissolved in 250 cc. of methylene chloride and 30 cc. of chlorosulfonic acid, and the solution so obtained is boiled for 10 minutes on a water bath. The solution is allowed to stand for 1 hour at room temperature, whereupon it is diluted with 300 cc. of acetone, allowed to stand for several hours in ice, whereupon it is suction-filtered and the filter residue is washed with acetone. The filter residue is then boiled in 150 cc. of acetone, the mixture is suction-filtered while hot, and the filter residue is washed with acetone. Approximately 58 grams of a sulfuric acid ester of the formula

(10) 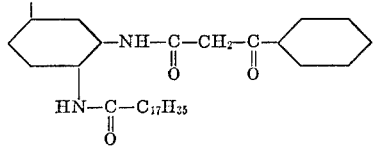

melting at 160° C. 55 grams of this acid are boiled in a solution of 20 grams of crystalline sodium acetate in 440 cc. of methanol, the mixture is cooled, suction-filtered, and the filter residue is washed with methanol. The yield is approximately 48 grams. Determination of the methoxyl groups of a sulfuric acid ester so obtained showed that the methoxy group was replaced by a sulfuric acid ester group. The sulfuric acid ester is suitable as a yellow coupler for the color development process.

Other solvents can be used instead of methylene chloride, provided they are not attacked by chlorosulfonic acid, for example, dichloroethane, chlorobenzene and petrol.

EXAMPLE 3

A mixture comprising 40 cc. of chloroform and 3 grams of chlorosulfonic acid is prepared and 5.8 grams of stearoylamino - benzoylacetylaminomethoxybenzene of the Formula 9 are added. The mixture is heated for 10 minutes, on a steam bath, the chloroform is evaporated off, 40 cc. of acetone are added to the residue, the mixture is allowed to stand for several hours, whereupon it is suction-filtered. The filter residue is boiled in 50 cc. of acetone, the mixture is suction-filtered, and the filter residue is washed with hot acetone. Approximately 2.7 grams of the sulfuric acid ester of the Formula 10 melting at 160° C. are obtained.

EXAMPLE 4

2.9 grams of stearoylamino-benzoylacetylaminomethoxybenzene of the Formula 9 are added to a mixture comprising 40 cc. of carbon disulfide and 1.5 grams of chlorosulfonic acid. The mixture is heated for 1 hour on a steam bath, the carbon disulfide is evaporated off, the residue is boiled in 10 cc. of acetone, the mixture is allowed to stand for several hours, whereupon it is suction-filtered and the filter residue is washed with acetone. The filter residue is then boiled with 10 cc. of acetone, the mixture is suction-filtered while hot, the filter residue is washed with acetone, and then dried. The yield of sulfuric acid ester of the Formula 10 melting at 159° C. is approximately 0.8 gram.

EXAMPLE 5

5.8 grams of stearoylamino - acetoacetylaminomethoxybenzene of the formula

(11) 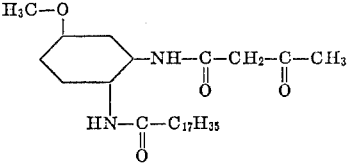

are added to a solution of 50 cc. of methylene chloride and 5.4 grams of chlorosulfonic acid. The mixture is heated for 5 minutes on a water bath, and the methylene chloride is drawn off in vacuo at a water temperature of 30° C. The residue is boiled in 80 cc. of methanol, whereby crystallized sodium acetate is added to the methanol in such an amount that the pH value is adjusted to about 7. The solution is suction-filtered while hot, and the mother liquid is concentrated to 40 to 50 cc. by evaporation, cooled in ice, suction-filtered, and the filter residue is washed several times with cold methanol. The yield of sulfuric acid ester is approximately 3.5 grams. The sulfuric acid ester in the form of the free acid corresponds to the formula

(12)
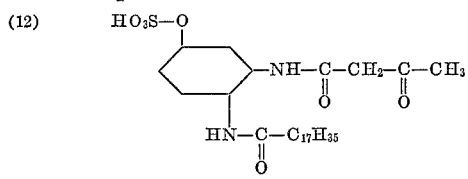

It can be used as a yellow coupler for the color development process.

EXAMPLE 6

63 grams of 1-amino-2-stearoylamino - 5 - methoxybenzene are condensed in the conventional manner with 40 grams of hexahydrobenzoylacetic acid ester. Approximately 40 grams of stearoylamino-hexahydrobenzoyl-aminomethoxybenzene melting at 108 to 110° C. are obtained. 17.4 grams of this product are introduced at room temperature into a solution of 8 cc. of chlorosulfonic acid and 120 cc. of methylene chloride. The mixture is boiled for 10 minutes on a water bath and is then allowed to stand for 1 hour at room temperature. The gelatinous contents of the flask are dissolved in 70 cc. of acetone and the solution is allowed to stand in an open dish; the bulk of the acetone and methylene chloride evaporates thereby, and crystals are precipitated. The residue is taken up in 50 cc. of acetone, the mixture is suction-filtered, and the filter residue is washed with acetone until the washings run neutral. Approximately 8 grams of the sulfuric acid ester of the formula

(13)
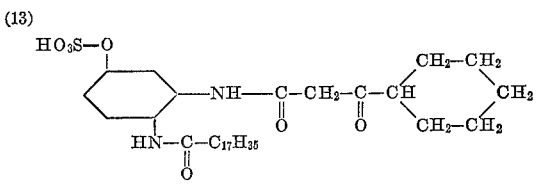

are obtained in the form of white crystals melting at 140 to 142° C. These crystals are dissolved in 100 cc. of methanol, 8 grams of crystalline sodium acetate are added to the solution, the mixture is boiled for five minutes, cooled in ice-water, and then washed with cold methanol. The yield of sodium salt is approximately 8.5 grams.

EXAMPLE 7

549 grams of 1-amino-4-ethoxybenzene are dissolved in 1630 cc. of pyridine, and stearic acid is added dropwise, at boiling temperature, to the solution until no reacted amine can be detected (approximately 1100 cc.). The hot reaction mixture is stirred into a mixture comprising 10 liters of water, 2 liters of hydrochloric acid of 30% strength and 5 kg. of ice, the radical is filtered off by suction, washed and dried, and it is then recrystallized from alcohol; it melts at about 100° C. 225 grams of the acylamino compound so obtained, 330 cc. of water and 99 grams of nitric acid of 65% strength are boiled for 45 minutes while stirring. The reaction mixture is then diluted with 10 liters of water, suction-filtered, and the filter residue is dried. The filter residue is recrystallized from alcohol and then again from a mixture of petrol and carbon; after this recrystallization it melts at 75 to 76° C. 500 grams of the product so obtained are mixed with 5 liters of ethanol in an autoclave and reduction is carried out with Raney nickel at 100° C. and at a pressure of 3 atmospheres (gauge); melting point 119 to 121° C. 200 grams of the reduction product so obtained are dissolved in 266 cc. of hot xylene, and 113 grams of benzoylacetic acid ethyl ester are added dropwise, while stirring, at boiling temperature, in the course of 1 hour, in which process 100 cc. of xylene are distilled off with the liberated alcohol. Stirring is continued for 4 hours at 120° C., after which the reaction mixture is stirred into 1500 cc. of methanol, and the mixture is cooled and suction-filtered.

After recrystallization from methanol and then from acetone, the product has a melting point of 114 to 116° C.

14 grams of the product so obtained that corresponds to the formula

(14)
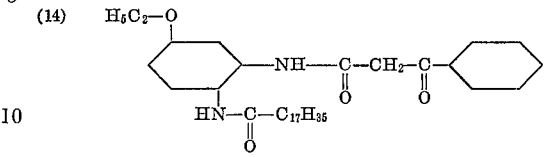

are added to a mixture comprising 65 cc. of methylene chloride and 8 cc. of chlorosulfonic acid, and the solution so obtained is boiled for 10 minutes under reflux. The solution is diluted with 80 cc. of acetone, allowed to stand in a dish for 2 hours, and is then suction-filtered; the filter residue is washed with acetone. The filter residue is then boiled in 50 cc. of acetone, the mixture is suction-filtering and the residue is again washed with acetone; melting point: 156 to 157° C.

The product is identical with the product of the Formula 10 obtained in the manner described in Example 2.

EXAMPLE 8

5-nitro-2-amino-1-methoxybenzene is condensed in the conventional manner with stearic acid chloride to form 5-nitro-2-stearoylamino-1-methoxybenzene melting at 91 to 94° C. This condensation product is reduced with Raney nickel in ethanol at 3 atmospheres (gauge) and at a temperature of 100° C. to produce 5-amino-2-stearoylamino-1-methoxybenzene, which melts at 106 to 109° C. The reduction product is then condensed with benzoylacetic acid ethyl ester in a manner in itself known to form 5 - benzoylacetylamino - 2 - stearoylamino-1-methoxybenzene, which melts at 117 to 119° C.

10 grams of the condensation product so obtained are introduced into a mixture comprising 55 cc. of methylene chloride and 8 cc. of chlorosulfonic acid, and the whole is boiled for 10 minutes under reflux. The reaction mixture is diluted with 100 cc. of acetone and the mixture is allowed to stand in a dish. After the solvents have evaporated, the residue is taken up in 100 cc. of acetone, the pH of the mixture is adjusted to 9 with a concentrated sodium methylate solution, the mixture is suction-filtered, and the filter residue is washed with acetone. The filtrate is concentrated to 20 cc., 80 cc. of methanol and 30 grams of crystalline sodium acetate are added, the whole is boiled up, suction-filtered, and the filter residue is then washed with a small amount of acetone. The white powder so obtained is the sodium salt of the acid sulfuric acid ester of the formula

(15)
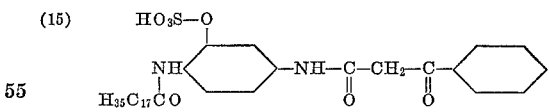

which can be used as a yellow coupler.

EXAMPLE 9

1 - amino - 2 - stearoylamino-5-methoxybenzene is condensed in known manner with para-methylbenzoylacetic acid ethyl ester. 58 grams of the condensation product so obtained of the formula

(16)
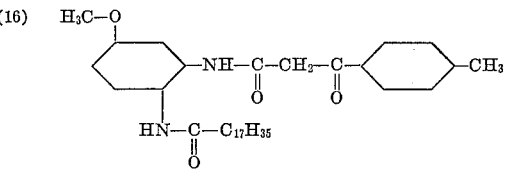

are dissolved in 250 cc. of methylene chloride and 30 cc. of chlorosulfonic acid, and the solution so obtained is boiled on a water bath for 10 minutes. The solution is allowed to stand for 1 hour at room temperature, whereupon it is diluted with 300 cc. of acetone and allowed to stand for several hours in ice. It is then suction-filtered and the residue is washed with acetone. The residue is boiled in 150 cc. of acetone, the mixture is suction-filtered while hot, and the filter residue is washed with acetone. Approximately 48 grams of a sulfuric acid ester of the formula

(17) 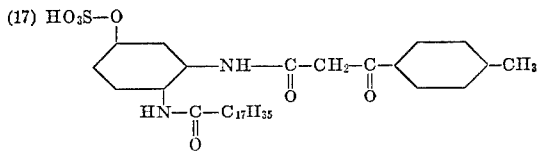

are obtained which can be used as yellow coupler.

EXAMPLE 10

336 grams of 1-methoxy-3-nitro-4-aminobenzene are dissolved in 1000 cc. of pyridine, and lauroylchloride is added to the solution dropwise, at the boil, until free amine is no longer detectable (approximately 438 grams). The reaction mixture is poured into 10 liters of water and 2 liter of hydrochloric acid of 30% strength, the mixture is suction-filtered and the filter residue is washed with water until the washings run neutral. After drying, the filter residue is recrystallized from methanol and then from petrol, after which it has a melting point of 69° C. 500 grams of the product so obtained are dissolved in 5 liters of alcohol in an autoclave and then reduced with Raney nickel at 100° C. under a pressure of 3 atmospheres (gauge); the melting point of the reduction product after being recrystallized twice from methanol is 106 to 108° C. 160 grams of the reduction product so obtained are dissolved in 400 cc. of xylene, and 110 grams of benzoylacetic acid methyl ester are added dropwise, at boiling temperature, in such a manner that 150 cc. of a xylene/methanol mixture are distilled off in the course of 20 minutes. The reaction mixture is poured into 2 liters of methanol and allowed to crystallize; the crystals melt at 124° C. 29 grams of 1-methoxy-3-benzoylacetylamino-4-lauroylamino-benzene are introduced into a mixture comprising 125 cc. of methylene chloride and 15 cc. of chlorosulfonic acid, and the mixture is heated at a gentle boil for 10 minutes. The reaction product is dissolved in 150 cc. of acetone, and the solution is placed in ice for 4 hours. The crystals that precipitate thereby are isolated by suction-filtration, washed with acetone until they are white, boiled in 100 cc. of acetone, isolated by suction-filtration and washed. The sulfuric acid ester of the formula

(18) 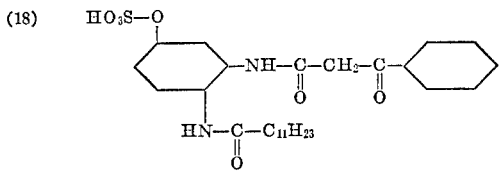

so obtained melts at 156° C. and can be used as yellow coupler.

EXAMPLE 11

15 grams of the sulfuric acid ester obtained in the manner described in Example 1 are dissolved in 150 cc. of water, and the solution is added to 1 kg. of silver chloride emulsion. The emulsion is cast on a layer support in the usual manner and dried. When a master image is copied on this layer and the layer is developed with a para-aminodimethyl-aminobenzene developer, a yellow image is obtained after the usual bleaching and fixation processes.

Yellow images are also obtained in the same manner with the sulfuric acid esters of the Formulae 10, 12, 13, 15, 17 and 18.

EXAMPLE 12

An exposed silver halide layer on a support is developed in a developer having the following composition:

| | Grams |
|---|---|
| Sulfate of 1-amino-4-diethylaminobenzene | 3 |
| Anhydrous sodium carbonate | 15 |
| Anhydrous sodium sulfite | 1 |
| Sodium bromide | 1 |
| Sodium salt of the sulfuric acid ester of 1-paramethoxybenzene - acetylamino - 2 - butyroyl - amino-5-hydroxybenzene, prepared in a manner analogous to that described in Example 10 | 5 |
| Bulked with water to 1000 cc. | |

After development, the layer is washed with water, bleached and fixed as above. A yellow image is obtained.

What is claimed is:

1. A light-sensitive photographic silver halide layer for the color developing process that contains as a color former for the yellow dyestuff an acylacetylamino compound of the formula

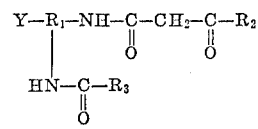

in which $R_1$ represents a benzene radical, $R_2$ represents a member selected from the group consisting of a benzene radical, a cycloalkyl radical and an alkyl radical, $R_3$ represents an alkyl radical containing at least 3 carbon atoms and Y represents $—OSO_3X$ wherein X is a member selected from the group consisting of hydrogen and an alkali group action.

2. A light sensitive photographic silver halide layer as claimed in claim 1 for the color developing process that contains as a color former for the yellow dyestuff an acylacetylamino compound of the formula

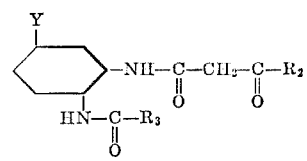

in which $R_2$ represents a benzene radical, $R_3$ represents an alkyl radical containing 11 to 21 carbon atoms and Y represents $—OSO_3X$ wherein X is a member selected from the group consisting of hydrogen and an alkali group cation.

3. A light-sensitive photographic silver halide layer as claimed in claim 1 for the color developing process that contains as a color former for the yellow dyestuff an acylacetylamino compound of the formula

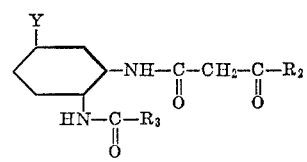

in which $R_2$ represents an alkyl radical containing at most 2 carbon atoms, $R_3$ represents an alkyl radical containing 11 to 21 carbon atoms and Y represents $—OSO_3X$ wherein X is a member selected from the group consisting of hydrogen and an alkali group cation.

4. A light-sensitive photographic silver halide layer as claimed in claim 1 for the color developing process that contains as a color former for the yellow dyestuff an acylacetylamino compound of the formula

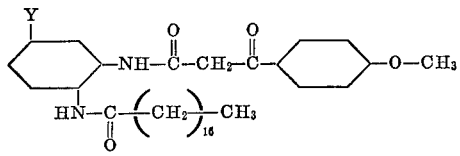

in which Y represents —OSO$_3$X wherein X is a member selected from the group consisting of hydrogen and an alkali group cation.

5. A light-sensitive photographic silver halide layer as claimed in claim 1 for the color developing process that contains as a color former for the yellow dyestuff an acylacetylamino compound of the formula

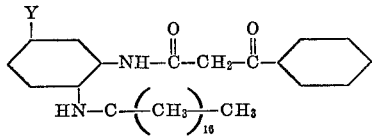

in which Y represents —OSO$_3$X wherein X is a member selected from the group consisting of hydrogen and an alkali group cation.

6. A light-sensitive photographic silver halide layer as claimed in claim 1 for the color developing process that contains as a color former for the yellow dyestuff an acylacetylamino compound of the formula

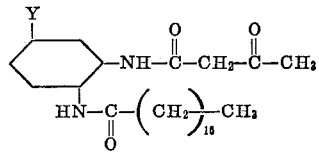

in which Y represents —OSO$_3$X wherein X is a member selected from the group consisting of hydrogen and an alkali group cation.

References Cited
UNITED STATES PATENTS

| | | | |
|---|---|---|---|
| 2,407,210 | 9/1946 | Weissberger et al. | 96—100 |
| 2,704,709 | 3/1955 | Sprung | 96—100 |
| 2,868,829 | 1/1959 | Ayres et al. | 96—100 |
| 2,875,057 | 2/1959 | McCrossen et al. | 96—100 |

J. TRAVIS BROWN, Primary Examiner

U.S. Cl. X.R.

96—56.6

CASE TEL-3/E/CIP

D

PO-1050
(5/69)

UNITED STATES PATENT OFFICE
CERTIFICATE OF CORRECTION

Patent No. 3,472,145     Dated October 14, 1969

Inventor(s) ALFRED FROEHLICH

It is certified that error appears in the above-identified patent and that said Letters Patent are hereby corrected as shown below:

Column 8, line 37, "action" should read --- cation ---.

Column 9, line 20, the lower portion of the formula should read:

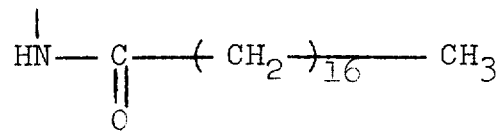

SIGNED AND
SEALED
JAN 5 1971

(SEAL)
Attest:

Edward M. Fletcher, Jr.
Attesting Officer

WILLIAM E. SCHUYLER, JR.
Commissioner of Patents